US011714855B2

(12) United States Patent
Mahindru et al.

(10) Patent No.: US 11,714,855 B2
(45) Date of Patent: Aug. 1, 2023

(54) VIRTUAL DIALOG SYSTEM PERFORMANCE ASSESSMENT AND ENRICHMENT

(71) Applicant: International Business Machines Corporation, Armonk, NY (US)

(72) Inventors: Ruchi Mahindru, Elmsford, NY (US); Atul Kumar, Bangalore (IN); Atri Mandal, Bangalore (IN); Daniela Rosu, Mt. Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 297 days.

(21) Appl. No.: 17/161,794

(22) Filed: Jan. 29, 2021

(65) Prior Publication Data

US 2022/0245199 A1 Aug. 4, 2022

(51) Int. Cl.
*G06F 16/9032* (2019.01)
*G06F 40/30* (2020.01)
*G06F 11/34* (2006.01)
*G06F 18/21* (2023.01)
*G10L 15/22* (2006.01)

(52) U.S. Cl.
CPC .... *G06F 16/90332* (2019.01); *G06F 11/3457* (2013.01); *G06F 18/2185* (2023.01); *G06F 40/30* (2020.01); *G10L 15/22* (2013.01)

(58) Field of Classification Search
CPC ........... G06F 11/3457; G06F 16/90332; G06F 18/2185; G06F 40/30; G10L 15/22
See application file for complete search history.

(56) References Cited

U.S. PATENT DOCUMENTS

| 6,532,401 | B2  |   | 3/2003 | Tackett et al. |
| 7,003,079 | B1  | * | 2/2006 | McCarthy ............. H04M 3/493 379/265.06 |
| 8,738,739 | B2  |   | 5/2014 | Makar et al. |
| 9,137,184 | B2  |   | 9/2015 | Kulkarni et al. |
| 9,240,016 | B2  |   | 1/2016 | Cronin et al. |
| 9,390,428 | B2  |   | 7/2016 | Rehman et al. |
| 9,753,962 | B2  |   | 9/2017 | Petschulat et al. |
| 10,657,385 | B2 |   | 5/2020 | Laput et al. |

(Continued)

OTHER PUBLICATIONS

López-Cózar, R., Callejas, Z., & McTear, M., "Testing the performance of spoken dialogue systems by means of an artificially simulated user.", 2006 The Artificial Intelligence Review, 26(4), 291-323. doi:http://dx.doi.org/10.1007/s10462-007-9059-9 (Year: 2006).*

(Continued)

*Primary Examiner* — Eric Yen
(74) *Attorney, Agent, or Firm* — Lieberman & Brandsdorfer, LLC

(57) ABSTRACT

Embodiments are provided that relate to a computer system, a computer program product, and a computer-implemented method for improving performance of a virtual dialog agent system employing an automated virtual dialog agent. Embodiments involve generating ground truth (GT) from a user's knowledge base, and leveraging the GT to evaluate how the virtual dialog agent performs with the GT. The evaluation measures quality of a multi-turn virtual dialog, and generates a remediation plan directed at an algorithmic improvement of the virtual dialog agent.

18 Claims, 10 Drawing Sheets

(56) References Cited

U.S. PATENT DOCUMENTS

| | | | |
|---|---|---|---|
| 10,657,962 B2 | 5/2020 | Zhang et al. | |
| 10,706,086 B1* | 7/2020 | Didericksen | G06F 16/3329 |
| 2016/0098379 A1* | 4/2016 | Bufe | G06F 16/313 |
| | | | 715/245 |
| 2016/0117601 A1* | 4/2016 | Gaucher | G06N 20/00 |
| | | | 706/11 |
| 2018/0157990 A1* | 6/2018 | Allen | G06F 16/9535 |
| 2019/0347326 A1 | 11/2019 | Kozhaya et al. | |
| 2019/0370696 A1* | 12/2019 | Ezen Can | G06N 20/00 |
| 2020/0034732 A1* | 1/2020 | Freed | G06N 3/006 |
| 2020/0137002 A1* | 4/2020 | Chavda | G06N 20/00 |
| 2020/0236068 A1* | 7/2020 | TeNyenhuis | G06F 40/35 |
| 2020/0379836 A1* | 12/2020 | Vaughn | G06F 18/217 |
| 2021/0133510 A1* | 5/2021 | Boulanger | G06F 18/241 |

OTHER PUBLICATIONS

Biswesh Mohapatra, Gaurav Pandey, Danish Contractor, Sachindra Joshi, "Simulated Chats for Task-oriented Dialog: Learning to Generate Conversations from Instructions", Oct. 2020, arXiv:2010.10216v1 (Year: 2020).*

Dietz, L., et al., "TREC Complex Answer Retrieval Overview", http://trec-car.cs.unh.edu, 2018.

Perazzi, F., et al., "A Benchmark Dataset and Evaluation Methodology for Video Object Segmentation", 2016 IEEE Conference on Computer Vision and Pattern Recognition (CVPR), Las Vegas, NV, 2016, pp. 724-732, doi: 10.1109/CVPR.2016.85.

Charrada, B., et al., "Towards a benchmark for traceability", IWPSE-EVOL '11: Proceedings of the 12th International Workshop on Principles of Software Evolution and the 7th annual ERCIM Workshop on Software Evolution, Sep. 2011, pp. 21-30, https://doi.org/10.1145/2024445.2024451.

Anonymous, "System and method for Measuring Fairness in Chatbots", IPCOM000263295D, Aug. 15, 2020.

Anonymous, "Method of using multiple chat bots", IPCOM000261940D, Apr. 20, 2020.

Anonymous, "Method and System for Dispatching User Questions to Relevant Human Expert or Bot", IPCOM000255653D, Oct. 5, 2018.

Coniam, David, "The Linguistic Accuracy of Chatbots: Usability from an ESL Perspective", Text & Talk 34(5), pp. 545-567, 2014.

Goh, Ong Sing, et al., "A Black-box Approach for Response Quality Evaluation of Conversational Agent Systems", International Journal of Computer and Information Engineering, vol. 4, No. 6, pp. 1119-1127, 2010.

Kaleem Mohammed, et al., "Framework for the Formulation of Metrics for Conversational Agent Evaluation", In RE-WOCHAT: Workshop on Collecting and Generating Resources for Chatbots and Conversational Agents-Development and Evaluation, Language Resources and Evaluation Conference (LERC 2016), pp. 20-23, May 28, 2016.

Kosir, Damjan, "Implementation and Testing of the Chatter", University of Ljubljana, 2013.

Kuligowska, Karolina, "Commercial Chatbot: Performance Evaluation, Usability Metrics and Quality Standards of Embodied Conversational Agents", Professionals Center for Business Research, Jan. 2015.

Meira, M.O. and Canuto, A.M.P., "Evalation of Emotional Agent's Architectures: an Approach Based on Quality Metrics and the Influence of Emotions on Users", Proceedings of the World Congress on Engineering, vol. 1, 2015.

Vetter, Michael, "Quality Aspects of Bots", Software quality and software testing in Internet, pp. 165-184, 2002.

Deriu, Jan, et al., "Survey on Evaluation Methods for Dialogue Systems", arXiv:1905.04071v2, Jun. 26, 2020.

International Search Report PCT/EP2022/050097, dated Apr. 19, 2022.

Li, Huaya, et al., "A Context-Aware Attention Network for Interactive Question Answering", arXiv:1612.07411v1, Dec. 22, 2016.

Fao, Chongyang, et al., "RUBER: An Unsupervised Method for Automatic Evaluation of Open-Domain Dialog Systems". arXiv:1701.03079v1, Jan. 11, 2017.

Ye, Winson, et al., "Open Questions for Next Generation Chatbots", 2020 IEEE/ACM Symposium on Edge Computing (SEC), Nov. 2020, pp. 346-351.

* cited by examiner

VIRTUAL DIALOG SYSTEM PERFORMANCE ASSESSMENT AND ENRICHMENT

BACKGROUND

One or more of the present embodiments relate to a virtual dialog system employing an automated virtual dialog agent, such as, for example, a "chatbot," and a related computer program product and a computer-implemented method. In certain exemplary embodiments, a quality standard of corresponding automated virtual dialog agent interactions is evaluated and selectively resolved, with the resolution directed at selective application of one or more remediation actions to the automated virtual dialog agent, for example, to improve performance with respect to natural language (NL) dialog events.

An automated virtual dialog agent uses artificial intelligence (AI) as a platform to conduct a NL interaction between the automated virtual dialog agent and, typically, a user such as a consumer or client or even another dialog agent. The interaction may involve product sales, customer service, information acquisition, or other types of interactions or transactions. Chatbots interact with the user through dialog, often either textual (e.g., online or by text) or auditory (e.g., by telephone). It is known in the art for the chatbot to function as a question-answer component between a user and the AI platform. The quality of the questions (or queries) and answers (or responses) are derived from the quality of question understanding, question transformation, and answer resolution. A frequent cause of not attaining a quality standard is commonly found in either inappropriate or inefficient question generation to solicit a corresponding response. This may be due to a lack of knowledge for an effective transformation of the question into an equivalent knowledge representation that maps to the answer, or it may be due to an inefficiency within the AI platform or the chatbot. For example, lack of synonyms or concept relations can limit the ability of the AI platform to determine that a question input by the customer or client is equivalent or related to a known question for which an answer is available within a dataset or database.

Businesses may place certain requirements like accuracy or interaction quality on virtual assistance that is expected to be satisfied before commercial deployment of the virtual system. For example, the virtual system might have a minimum performance requirement of, e.g., 50 percent accuracy for a support agent user base or 90 percent accuracy for an end user base. Accordingly, it is desirable to subject the dialog systems to benchmarking or quality testing before deployment.

SUMMARY

The embodiments include a system, a computer program product, and a method for improving performance of a dialog system. This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

In one aspect, a computer system is provided having a processor operatively coupled to memory, and an artificial intelligence (AI) platform operatively coupled to the processor. The AI platform includes one or more tools to improve performance of a virtual dialog agent. The tools include a ground truth (GT) manager, a simulator, an evaluation manager, and a remediation manager. The GT manager is configured to automatically generate GT from a knowledge source. The simulator is configured to simulate a NL dialog interaction using the virtual dialog agent. More specifically, the simulator is configured to leverage the GT to drive simulated NL dialog generated output and create a corresponding simulation log. The evaluation manager is configured to evaluate performance of the virtual dialog agent with respect to the simulation log in view of the GT. The remediation manager is configured to identify and selectively implement one or more remediation actions to the dialog system in view of a performance threshold.

In another aspect, a computer program product is provided with a computer readable storage medium or media, and program code stored on the computer readable storage medium or media. The program code is executable by a computer processor to improve performance of a virtual dialog agent. Program code is provided to automatically generate ground truth (GT) from a knowledge source. Program code is further provided to simulate a NL dialog interaction using the virtual dialog agent. The simulation leverages the GT to drive simulated NL dialog generated output and creates a corresponding simulation log. Program code is provided to evaluate performance of the virtual dialog agent with respect to the simulation log in view of the GT, and identify and selectively implement one or more remediation actions to the dialog system in view of a performance threshold.

In yet another aspect, a computer-implemented method is provided for improving performance of a virtual dialog agent. The method is configured to automatically generate ground truth (GT) from a knowledge source. A NL dialog interaction is subject to a simulation using the virtual dialog agent. The simulation leverages the GT to drive simulated NL dialog generated output and creates a corresponding simulation log. Performance of the virtual dialog agent is subject to evaluation with respect to the simulation log in view of the GT. One or more remediation actions to the dialog system are identified and selectively implemented in view of a performance threshold.

These and other features and advantages will become apparent from the following detailed description of the presently exemplary embodiment(s), taken in conjunction with the accompanying drawings.

BRIEF DESCRIPTION OF THE SEVERAL VIEWS OF THE DRAWINGS

The drawings referenced herein form a part of the specification and are incorporated herein by reference. Features shown in the drawings are meant as illustrative of only some embodiments, and not of all embodiments, unless otherwise explicitly indicated.

DETAILED DESCRIPTION

Figure 1:
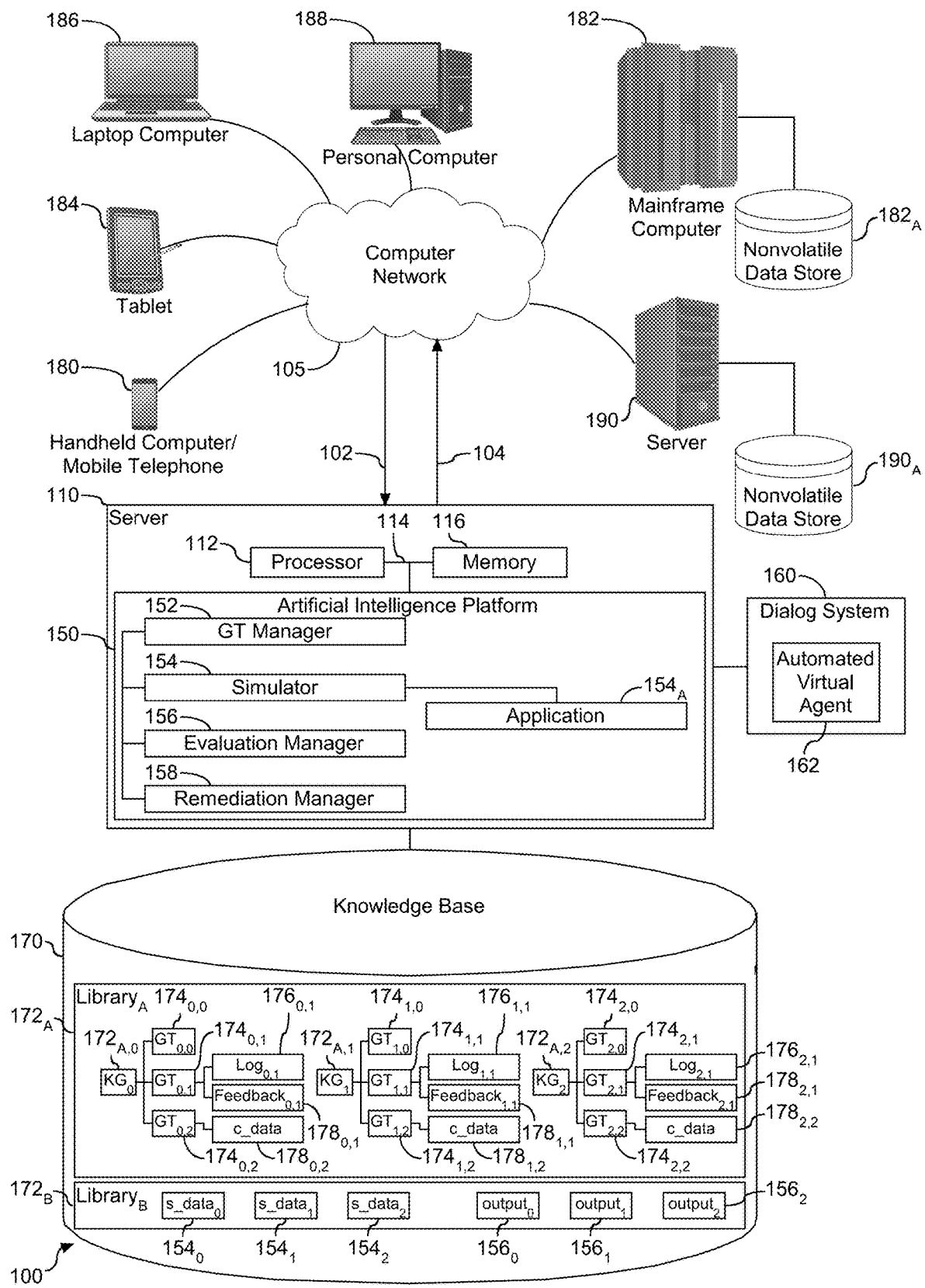
FIG. 1 depicts a system diagram illustrating an artificial intelligence platform computing system in a network environment.

It will be readily understood that the components of the present embodiments, as generally described and illustrated in the Figures herein, may be arranged and designed in a wide variety of different configurations. Thus, the following detailed description of the exemplary embodiments of the apparatus, system, method, and computer program product, as presented in the Figures, is not intended to limit the scope of the embodiments, as claimed, but is merely representative of selected embodiments.

Reference throughout this specification to "a select embodiment," "one embodiment," "an exemplary embodiment," or "an embodiment" means that a particular feature, structure, or characteristic described in connection with the embodiment is included in at least one embodiment. Thus, appearances of the phrases "a select embodiment," "in one embodiment," "in an exemplary embodiment," or "in an embodiment" in various places throughout this specification are not necessarily referring to the same embodiment. The embodiments described herein may be combined with one another and modified to include features of one another. Furthermore, the described features, structures, or characteristics of the various embodiments may be combined and modified in any suitable manner.

The illustrated embodiments will be best understood by reference to the drawings, wherein like parts are designated by like numerals throughout. The following description is intended only by way of example, and simply illustrates certain selected embodiments of devices, systems, products, and processes that are consistent with the embodiments as claimed herein.

In the field of artificially intelligent computer systems, natural language systems (such as the IBM Watson® artificially intelligent computer system or and other natural language systems) process natural language based on knowledge acquired by the system. To process natural language, the system may be trained with data derived from a database or corpus of knowledge, but the resulting outcome can be incorrect or inaccurate for a variety of reasons.

Machine learning (ML), which is a subset of Artificial intelligence (AI), utilizes algorithms to learn from data and create foresights based on this data. AI refers to the intelligence when machines, based on information, are able to make decisions, which maximizes the chance of success in a given topic. More specifically, AI is able to learn from a data set to solve problems and provide relevant recommendations. Cognitive computing is a mixture of computer science and cognitive science. Cognitive computing utilizes self-teaching algorithms that use data minimum, visual recognition, and natural language processing to solve problems and optimize human processes.

At the core of AI and associated reasoning lies the concept of similarity. The process of understanding natural language and objects requires reasoning from a relational perspective that can be challenging. Structures, including static structures and dynamic structures, dictate a determined output or action for a given determinate input. More specifically, the determined output or action is based on an express or inherent relationship within the structure. This arrangement may be satisfactory for select circumstances and conditions. However, it is understood that dynamic structures are inherently subject to change, and the output or action may be subject to change accordingly. Existing solutions for efficiently identifying objects and understanding natural language and processing content response to the identification and understanding as well as changes to the structures are extremely difficult at a practical level.

An automated virtual agent, referred to herein as a chatbot, is an Artificial Intelligence (AI) program that simulates interactive human conversation by using pre-calculated phrases and auditory or text-based signals. Chatbots are increasingly used in an electronic platform for customer service support. In an embodiment, the chatbot may function as an intelligent virtual agent. Each chatbot experience is comprised of a set of communications comprised of user actions and dialog system actions, with the experience having a discriminative behavior pattern. It is understood in the art that chatbot dialogs may be evaluated and subject to diagnosis to ascertain elements of the chatbot that may warrant changes to improve future chatbot experiences.

A system, a computer program product, and a method evaluate performance of an automated virtual dialog agent, and in an exemplary embodiment, a multi-turn dialog system, by automatically generating benchmarking data, also referred to herein as ground truth (GT) from a knowledge base to evaluate the automated virtual dialog agent. In an exemplary embodiment, the GT is automatically generated from a user's knowledge base and not from a standard or generic dataset. The benchmark data generation functions as a venue to extract GT within the scope of the knowledge base. A simulated dialog interaction is carried out with the automated virtual dialog agent as supported with the GT. As shown and described herein, the automated virtual dialog agent is subject to a performance evaluation that involves a comparison of a corresponding simulation log in view of the GT. Metrics for measuring evaluation of the automated virtual dialog agent include, for example, a determination of the correctness of a response of the automated virtual dialog agent, the relevance of disambiguation or follow-up question(s) asked by the automated virtual dialog agent, the number of disambiguation or follow-up questions asked by the automated virtual dialog agent, and/or the order of disambiguation or follow-up questions asked by the automated virtual dialog agent.

The automated virtual dialog agent (also referred to herein as a chatbot platform or chatbot) functions as an AI interaction interface. As shown and described herein, the chatbot platform is subject to an evaluation based on a comparison of a simulated interaction with GT. Ground truth (also referred to herein as GT) is a term used in machine learning that refers to information provided by direct observation, e.g. empirical evidence, as opposed to information provided by inference. As explained in greater detail below, GT data includes, for example, content-based information such as of a knowledge graph or knowledge base, usage logs (especially with feedback information concerning those logs), subject matter expert (SME) records, or any combination thereof.

Referring to FIG. 1, a schematic diagram of an artificial intelligence (AI) platform and corresponding system (100) is depicted. As shown, a server (110) is provided in communication with a plurality of computing devices (180), (182), (184), (186), (188), and (190) across a network connection, e.g. computer network, (105). The server (110) is configured with a processing unit, e.g., a processor, in communication with memory across a bus. The server (110) is shown with an AI platform (150) operatively coupled to a dialog system (160), a corresponding virtual agent (162), e.g. chatbot, and an associated knowledge base (170), e.g. data source. The computing devices (180), (182), (184), (186), (188), and (190) may be provided with a visual display, audio interface, an audio-video interface, or other types of interfaces configured to allow the user to interface with a representation of a virtual agent, e.g. chatbot, (162).

The AI platform (150) is operatively coupled to the network (105) to support interaction with the virtual dialog agent (162) from one or more of the computing devices (180), (182), (184), (186), (188), and (190). More specifically, the computing devices (180), (182), (184), (186), (188), and (190) communicate with each other and with other devices or components via one or more wired and/or wireless data communication links, where each communication link may comprise one or more of wires, routers, switches, transmitters, receivers, or the like. In this networked arrangement, the server (110) and the network connection (105) enable communication detection, recognition, and resolution. Other embodiments of the server (110) may be used with components, systems, sub-systems, and/or devices other than those that are depicted herein.

The AI platform (150) is also shown herein operatively coupled to the knowledge base (170), also referred to herein as a corpus of information. As shown, the knowledge base (170) is configured with a plurality of libraries, shown herein by way of example as Library$_A$ (172$_A$) and Library$_B$ (172$_B$). While two libraries are shown in FIG. 1, it should be understood that the knowledge base (170) may include fewer or more libraries. Further, the libraries, e.g. Library$_A$ (172$_A$) and Library$_B$ (172$_B$) may be combined together. The libraries, Library$_A$ (172$_A$) and Library$_B$ (172$_B$) may exist across a plurality of knowledge domains, including knowledge base (170) and other knowledge domains (not shown). Each library is populated with data, either in a structured or unstructured form. For example, in an exemplary embodiment, the structured data may be in the form of a knowledge graph. By way of example, Library$_A$ (172$_A$) is populated with structured knowledge domains represented as knowledge graphs (KGs), shown in FIG. 1 as KG$_0$ (172$_{A,0}$), KG$_1$ (172$_{A,1}$), and KG$_2$ (172$_{A,2}$).

The AI platform (150) is shown herein with a plurality of tools to support evaluation, benchmarking, and improving performance of the dialog system (160) and the corresponding automated virtual agent (e.g., chatbot) (162) experience. The tools include a GT manager (152), a simulator (154), an evaluation manager (156), and a remediation manager (also referred to herein as a director) (158).

The GT manager (152) is configured to automatically generate GT from one or more knowledge sources, e.g. knowledge domains, shown herein by way of example in Library$_A$ (172$_A$). The generated GT may be content based, usage based, and/or curation based. Content based GT is automatically generated by leveraging a corresponding structured dataset to generate questions based on symptoms, question variants, and graph traversal, and to obtain related entities for the symptoms. In an exemplary embodiment, a symptom is a phrase that describes some problems or issue with a system or any of its components. Details of the content based GT generation are shown and described in FIG. 3. Usage based GT is directed at GT generation from a usage log in the form of a recording of collected data as a workflow for query text. Details of the usage based GT generation is shown and described in FIG. 4. Curation based GT is directed at manually generated data by a subject matter expert (SME). In this embodiment, the SME provides assistance for selection options from the knowledge base to generate test data. Details of the curation based GT generation is shown and described in FIG. 5. Accordingly, the content, usage, and curation based GT each leverage a corresponding knowledge domain, either in a structured or unstructured format, to support and enable automatic generation of GT.

Each library is populated with one or more knowledge domains represented as structured knowledge, e.g. knowledge graphs, subject to processing by the GT manager (152). As shown by way of example, a first knowledge domain is represented as a first knowledge graph (KG), shown in FIG. 1 as KG$_0$ (172$_{A,0}$), and is shown with corresponding content based GT, GT$_{0,0}$ (174$_{0,0}$), usage based GT, GT$_{0,1}$ (174$_{0,1}$), and curation based GT$_{0,2}$ (174$_{0,2}$). Similarly, a second knowledge domain is represented as a second KG, shown in FIG. 1 as KG$_1$ (172$_{A,1}$), and is shown with content based GT, GT$_{1,0}$ (174$_{1,0}$), usage based GT, GT$_{1,1}$ (174$_{1,1}$), and curation based GT$_{1,2}$ (174$_{1,2}$), and a third knowledge domain is represented as a third KG, shown in FIG. 1 as KG$_2$ (172$_{A,2}$), and is shown with content based GT, GT$_{2,0}$ (174$_{2,0}$), usage based GT, GT$_{2,1}$ (174$_{2,1}$), and curation based GT$_{2,2}$ (174$_{2,2}$). The three categories of GT shown herein, e.g. content, usage, and curation, may serve different roles for evaluation of the virtual agent. In an exemplary embodiment, any combination of the three categories of GT may be leveraged for the virtual agent evaluation. The quantity of GT categories shown herein should not be considered limiting. In an exemplary embodiment, the quantity of categories may include a subset of the categories, a combination of the categories, or new categories.

Interactions with the chatbot (162) are in the form of queries and corresponding responses, and a sequence of follow-up disambiguation questions and their responses. Such interactions, and specifically the data associated with the interactions, are recorded and populated in one or more of the libraries of the knowledge base (170). In one or more embodiments, one initial NL query and one outcome are generated in view of the corresponding structured knowledge, e.g. KG. In one or more other embodiments, an initial NL query is generated and one or more follow-up NL queries are generated to arrive at the NL outcome as part of a multi-turn or multi-step conversation or interaction. The generation of a follow-up query or follow-up queries is particularly useful where, for example, an initial response to the initial NL query does not provide a satisfactory response, whether due to an ambiguity in the initial response or another reason. In such instances, a first follow-up or disambiguation query is generated in view of the corresponding structured knowledge, e.g. KG. In the event the first follow-up query does not provide a satisfactory response, a second follow-up or disambiguation query is generated in view of the corresponding structured knowledge. This multi-turn conversation may be continued until the disambiguation is satisfactorily resolved. For explanatory purposes, only first and second sets of follow-up queries are described above. However, it should be understood that additional (e.g., third, fourth, etc.) follow-up queries may be generated as part of the multi-turn conversation or interaction. Accordingly, the content based GT in the form of generated questions based on symptoms, question variants, and knowledge graph traversals to obtain related entries for symptoms is generated by the GT manager (152).

In addition to the content based GT, the GT manager (152) generates usage based GT and curation based GT. The usage based GT is shown herein as $GT_{0,1}$ ($174_{0,1}$), $GT_{1,1}$ ($174_{1,1}$), and $GT_{2,1}$ ($174_{2,1}$). The usage based GT is comprised of both a log and feedback data. As shown by way of example, usage based GT, $GT_{0,1}$ ($174_{0,1}$), is shown with $log_{0,1}$ ($176_{0,1}$) and $feeback_{0,1}$ ($178_{0,1}$), usage based GT, $GT_{1,1}$ ($174_{0,1}$), is shown with $log_{1,1}$ ($176_{1,1}$) and $feeback_{1,1}$ ($178_{1,1}$), and usage based GT, $GT_{2,1}$ ($174_{2,1}$), is shown with $log_{2,1}$ ($176_{2,1}$) and $feeback_{2,1}$ ($178_{2,1}$). Similarly, the curation based GT, $GT_{0,2}$ ($174_{0,2}$), is populated with curation data, referred to herein as $c\_data_{0,2}$ ($178_{0,2}$), curation based GT, $GT_{1,2}$ ($174_{1,2}$), is shown with $c\_data_{1,2}$ ($178_{1,2}$), and curation based GT, $GT_{2,2}$ ($174_{2,2}$), is shown with $c\_data_{2,2}$ ($178_{2,2}$). Accordingly, the GT manager (152) generates multiple categories of GT, each associated with a corresponding knowledge domain and stored in the knowledge base (170).

The dialog system (160) is an interactive AI interface configured to support communication between a virtual agent and a non-virtual agent, such as a user (e.g., end user), which can be human or software, and potentially an AI virtual agent. The interactions that transpire generate what are referred to as conversations or dialog interactions, with the content of such conversation or dialog interaction between a user and a virtual agent.

The AI platform (150) is shown herein operatively coupled to the dialog system (160) and its virtual dialog agent (162), which is configured to receive input (102) from various sources across the network (105). For example, the dialog system (160) may receive input across the network (105) and leverage one of the knowledge domains and corresponding GT, to create output or response content. The created output or response content may be returned as output (104) across the computer network (105) to the same source and/or another source or sources.

The various computing devices (180), (182), (184), (186), (188), and (190) in communication with the network (105) may include access points to the dialog system (160). The network (105) may include local network connections and remote connections in various embodiments, such that the AI platform (150) may operate in environments of any size, including local and global, e.g., the Internet. Additionally, the AI platform (150) serves as a back-end system that can make available a variety of knowledge extracted from or represented in documents, network accessible sources and/ or structured data sources. In this manner, some processes populate the AI platform (150), with the AI platform (150) also including input interfaces to receive requests and respond accordingly.

As shown, users may access the AI platform (150) and the operatively coupled dialog system (160) via a network connection or an Internet connection to the network (105), and may submit natural language (NL) input to the dialog system (160) from which the AI platform (150) may effectively determine an output response related to the input by leveraging the operatively coupled knowledge base (170) and the tools that comprise the AI platform (150).

The simulator (154) interfaces with the dialog system (160) to simulate one or more NL dialog interactions using the automated virtual dialog agent (162) of the dialog system (160). In an exemplary embodiment, the simulator (154) leverages an operatively coupled simulator application ($154_A$) to conduct a simulated interaction with the chatbot (162). Details of the simulation are shown and described in FIG. 6. The simulation defines a set of test queries with respective answers as present in a corresponding knowledge domain, which in an exemplary embodiment is represented as a knowledge graph. Output from the simulation is referred to herein as simulation data and includes a log of all queries and corresponding responses, which in an exemplary embodiment includes a solution or one or more disambiguation options. A second library, $Library_B$ ($172_B$) is populated in the knowledge base (170), and is further populated with simulation data, referred to herein as s_data. As shown herein by way of example, $s\_data_0$ ($154_0$) represents simulation data for a simulation of the chatbot (162) leveraging knowledge domain ($172_{A,0}$), $s\_data_1$ ($154_1$) represents simulation data for a simulation of the chatbot (162) leveraging knowledge domain ($172_{A,1}$), and $s\_data_2$ ($154_2$) represents simulation data for a simulation of the chatbot (162) leveraging knowledge domain ($172_{A,2}$). Although only one set of simulation data is shown associated with each knowledge domain, it is understood that any one of the knowledge domains may be utilized for a simulation of the chatbot (162), with each simulation generating separate or additional simulation data. Similarly, although each knowledge domain is shown with simulation data, it is understood that in an exemplary embodiment not all of the knowledge domains may have been leveraged for simulation of the chatbot (162), and as such would not have corresponding simulation data. Accordingly, for each knowledge domain leveraged by the interaction simulator (154), output in the form of simulation data is created and associated with the corresponding knowledge domain.

As shown herein, the evaluation manager (156), which is operatively coupled to the simulator (154), is configured to evaluate performance of the automated virtual dialog agent (162). The evaluation manager (156) compares the simulated interaction that is represented as simulation data with GT for the corresponding knowledge domain. The GT employed in the comparison may include one or more of the GT types, including content, usage, and curation based GT. Details of the simulation interaction evaluation are shown and described in FIG. 7. Output from the evaluation manager is multi-dimensional, including the quantity of disambiguation questions asked and the difference with respect to the test data, whether or not the questions were asked in a particular order, and if the presented solution matches with an intended solution. As shown herein by way of example, $output_0$ ($156_0$) represents multi-dimensional output of the evaluation of simulation data ($154_0$) leveraging knowledge domain ($172_{A,0}$), $output_1$ ($156_1$) represents multi-dimensional output of the evaluation of simulation data ($154_1$) leveraging knowledge domain ($172_{A,1}$), and $output_2$ ($156_2$) represents multi-dimensional output of the evaluation of simulation data ($154_2$) leveraging knowledge domain ($172_{A,2}$). Accordingly, the evaluation manager (156) conducts an assessment of the chatbot (162) and documents in the assessment in the form of corresponding output data.

The output data includes insights and recommendations based on various metrics collected. Business goals may be pre-defined in terms of metrics and corresponding metric measurements, such as expected accuracy of the chatbot, along with an acceptable error range. Examples of such metrics includes, but is not limited to, accuracy, interaction overhead, interaction length, quality of follow-up questions, and response time. In an exemplary embodiment, the metrics may be prioritized, such as assignment of a priority to accuracy in place of response time. Recommendations corresponding to the collected metrics are directed at an automatic comparison of a defined or pre-defined business goal against an actual metric reflecting performance and identification of one or more corresponding remediation actions. As shown herein, the remediation manager (158), which is operatively coupled to the evaluation manager (156), functions to identify the one or more remediation actions for application to the dialog system (160) based on the corresponding output. For example, in an embodiment, the one or more remediation actions may be identified when the performance evaluation of the virtual dialog agent (162) fails to satisfy a performance threshold. In an exemplary embodiment, the recommendation action(s), also referred to herein as a recommendation plan, is directed at improving interaction overhead, which may be implemented by collecting additional real-time data, and reducing interaction length. In an embodiment, other recommendations may be implemented, and as such the examples provided herein should not be considered limiting. Accordingly, the remediation manager (158) is configured to implement the one or more remediation actions to improve the performance of the automated virtual dialog agent (162).

The dialog events that are created or enabled by the dialog system (160) may be processed by the IBM Watson® server (110), and the corresponding AI platform (150). The GT manager (152) generates GT from the user's knowledge base and facilitates and enables evaluation of the dialog system (160) as supported by the generated GT. In some illustrative embodiments, server (110) may be the IBM Watson® system available from International Business Machines Corporation of Armonk, N.Y., augmented with the mechanisms of the illustrative embodiments described hereafter.

The GT manager (152), the simulator (154), the evaluation manager (156), and the remediation manager (158), hereinafter referred to collectively as AI tools, are shown as being embodied in or integrated within the AI platform (150) of the server (110). The AI tools may be implemented in a separate computing system (e.g., 190) that is connected across network (105) to the server (110). Wherever embodied, the AI tools function to evaluate dialog events, extract behavior characteristics from the requests and responses, and selectively identify and apply one or more corresponding remediation actions to improve performance of the dialog system (160).

Types of information handling systems that can utilize the artificial intelligence platform (150) range from small handheld devices, such as handheld computer/mobile telephone (180) to large mainframe systems, such as mainframe computer (182). Examples of handheld computer (180) include personal digital assistants (PDAs), personal entertainment devices, such as MP4 players, portable televisions, and compact disc players. Other examples of information handling systems include pen, or tablet computer (184), laptop, or notebook computer (186), personal computer system (188), and server (190). As shown, the various information handling systems can be networked together using computer network (105). Types of computer network (105) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (190) utilizes nonvolatile data store ($190_A$), and mainframe computer (182) utilizes nonvolatile data store ($182_A$). The nonvolatile data store ($182_A$) can be a component that is external to the various information handling systems or can be internal to one of the information handling systems.

The information handling system employed to support the AI platform (150) may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 2:
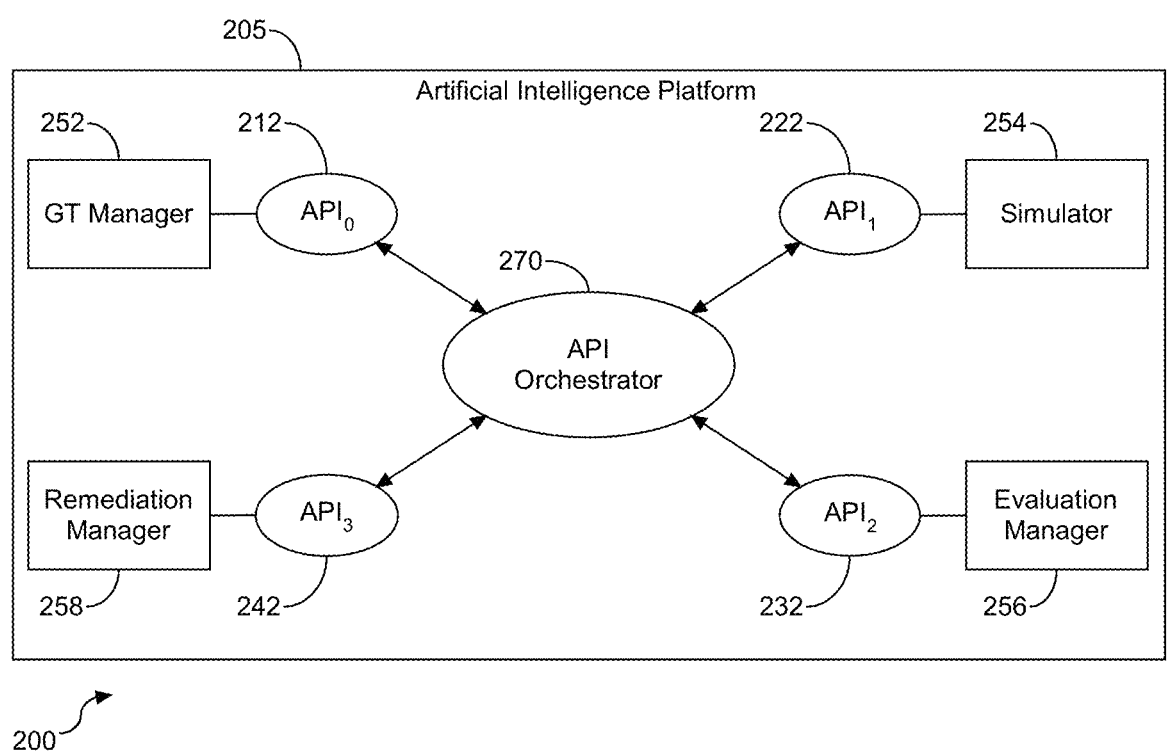
FIG. 2 depicts a block diagram illustrating the artificial intelligence platform tools, as shown and described in FIG. 1, and their associated application program interfaces.

An Application Program Interface (API) is understood in the art as a software intermediary between two or more applications. With respect to the artificial intelligence platform (150) shown and described in FIG. 1, one or more APIs may be utilized to support one or more of the tools (152), (154), (156), and (158) and their associated functionality. Referring to FIG. 2, a block diagram (200) is provided illustrating the tools (152), (154), (156), and (158), and their associated APIs. As shown, a plurality of tools are embedded within the AI platform (205), with the tools including the GT manager (252) associated with $API_0$ (212), the simulator (254) associated with $API_1$ (222), the evaluation manager (256) associated with $API_2$ (232), and the remediation manager (258) associated with $API_3$ (242). Each of the APIs may be implemented in one or more languages and interface specifications. $API_0$ (212) provides functional support to automatically generate GT from a knowledge source; $API_1$ (222) provides functional support to simulate a NL dialog with the automated virtual agent leveraging the GT; $API_2$ (232) provides functional support to evaluate performance of the automated virtual dialog agent based on the simulation; and $API_3$ (242) provides functional support to selectively identify and implement one or more remediation actions directed at improving performance of the dialog system. As shown, each of the APIs (212), (222), (232), and (242) are operatively coupled to an API orchestrator (260), otherwise known as an orchestration layer, which is understood in the art to function as an abstraction layer to transparently thread together the separate APIs. In an embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 3:
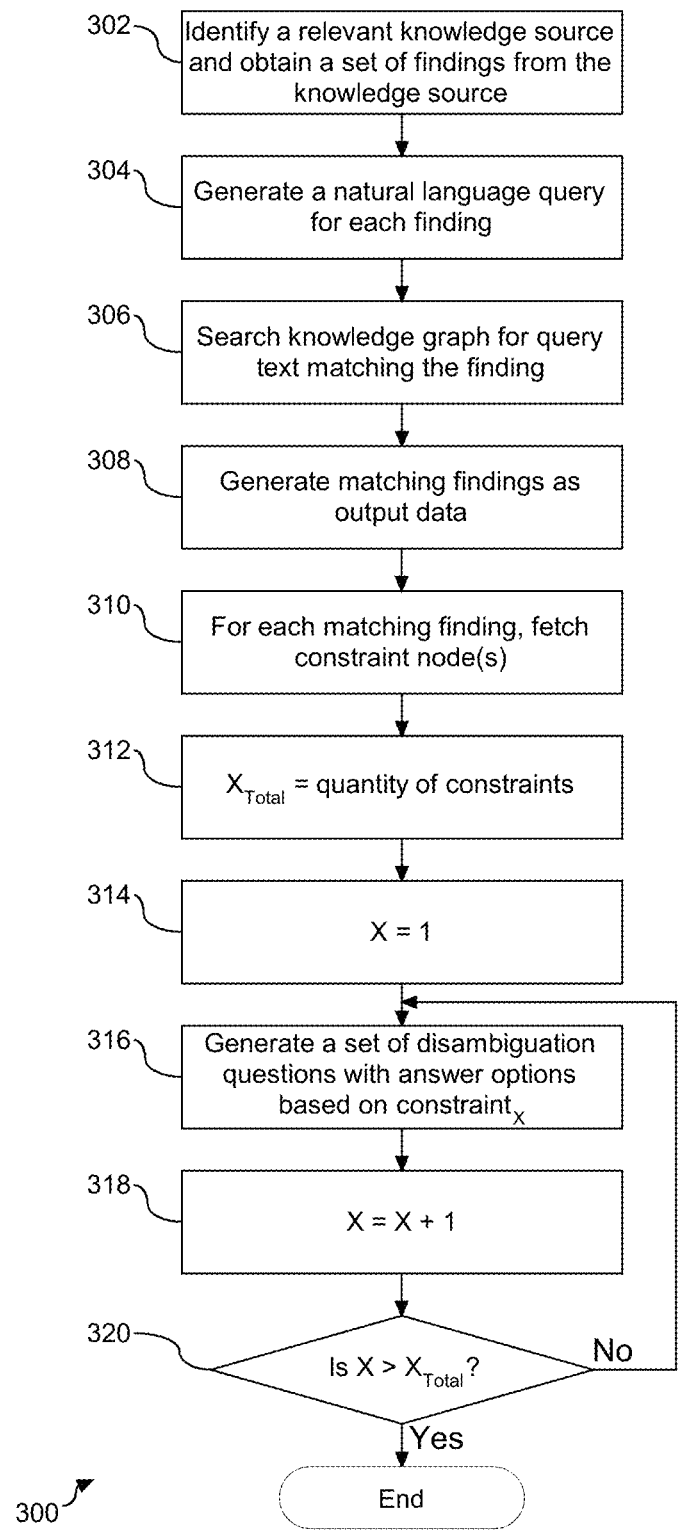
FIG. 3 depicts a flowchart illustrating an embodiment of a method of automatically generating ground truth from a corresponding knowledge source.

Referring to FIG. 3, a flow chart (300) illustrating a process for automatically generating ground truth (GT) from a corresponding knowledge source is provided. As shown and described, the knowledge source may be in a structured form, such as a knowledge graph, or an unstructured form. For descriptive purposes, the GT generating process is being described with respect to a structured knowledge source, although such structured formats should not be considered limiting. A relevant knowledge source is identified and a set of symptoms from the knowledge source is obtained (302). In an exemplary embodiment, a sub-set of symptoms is identified using one or more selection criteria. For each symptom, a natural language query is generated (304), which in an exemplary embodiment employs variance generation and adding or removing entities. In an embodiment, variance generation is a natural language equivalent of a phrase, and is utilized herein to expand the scope of the query through identification of comparable or equivalent terms. The knowledge graph, e.g. structured representation of the knowledge domain, is searched for query text matching the symptom (306). In an exemplary embodiment, a text matching technique, such as universal sentence encoding, is utilized at step (306). Output is generated from the search at step (306) in the form of matching symptoms, also referred to herein as matches (308). Each matching symptom has a corresponding score or weight. In an exemplary embodiment, approximate matching of two or more phrases or sentences is a common operation in natural language processing. The set of matching symptoms from step (308) is subject to a threshold evaluation, which in an exemplary embodiment is directed at quality of the matching symptom. Each matching symptom has a constraint. A constraint node and nodes connected to the constraint node are fetched for each matching symptom (310). The constraint node is not connected to another constraint node. The fetching at step (310) is directed at identification of both the constraint node(s) and all other nodes connected to the constraint node(s). For example, the solution for the symptom "battery issue while charging" and the specific solution to this symptom may be constrained by a specific hardware model number and series. Accordingly, the constraint node(s) connects to all relevant nodes in the graphs as an indicator of the constraint.

The variable $X_{Total}$ is assigned to the quantity of constraints (312) and a corresponding constraint counting variable, X, is initialized (314). A set of disambiguation questions with answer options is generated based on the constraint, e.g. constraint$_X$, (316). In an exemplary embodiment, multiple constraints represent a multiple step conversation, and at each step the disambiguation question and answer options is generated, and the process is repeated until no disambiguation is required. Following step (316), the constraint counting variable, X, is incremented (318), and it is determined if each of the constraints has been processed (320). A negative response to the determination is followed by a return to step (316), and a positive response concludes the question and answer(s) generation. Accordingly, one or more disambiguation question(s) and one or more corresponding answer option(s) for each constraint and each disambiguation selection path is recorded and saved as GT.

Figure 4:
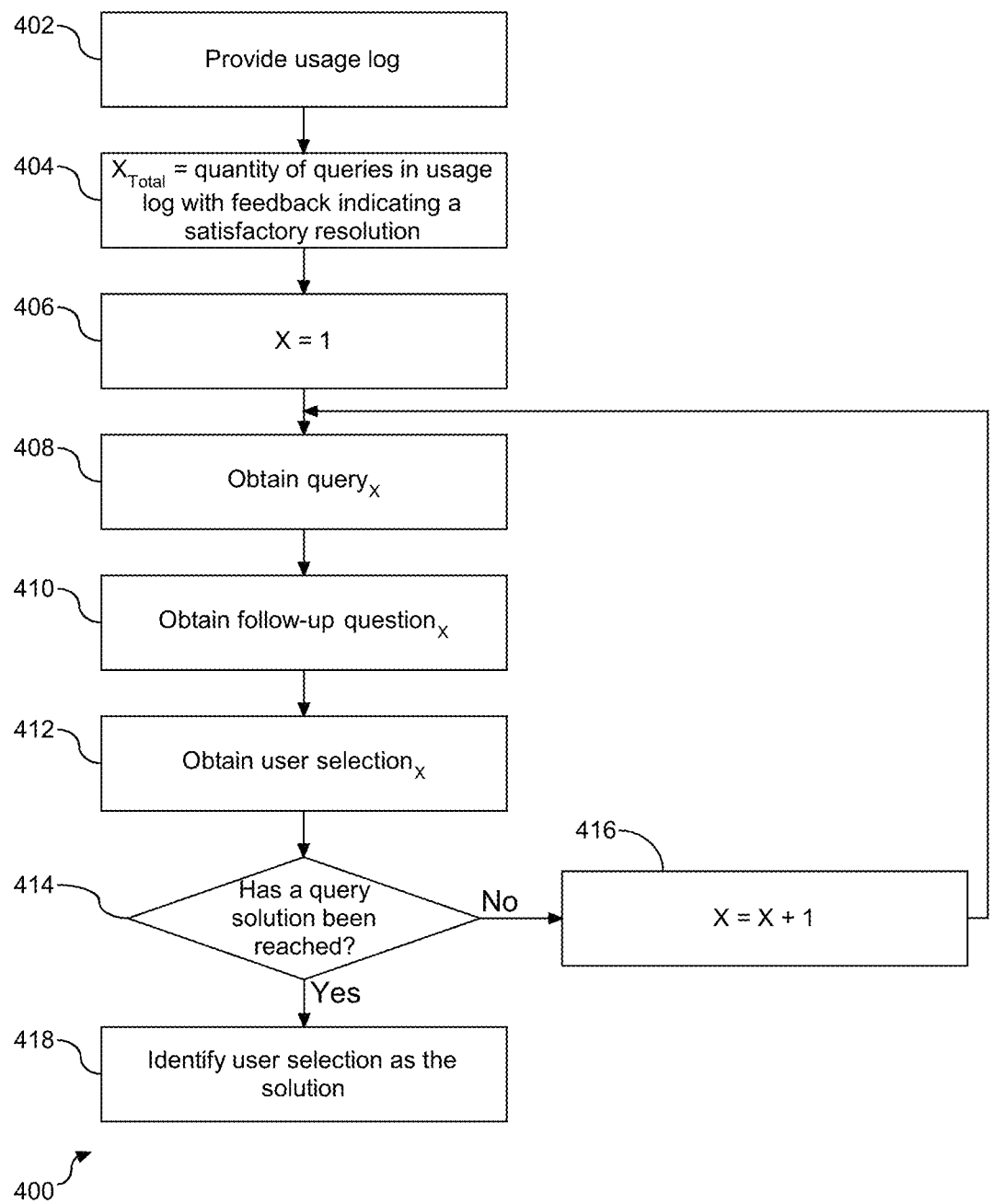
FIG. 4 depicts a flowchart illustrating an embodiment of a method of generating usage based GT.

As shown and described in FIG. 3, content based GT is automatically generated by leveraging a knowledge graph to generate questions and graph traversal to identify one or more related entities for one or more corresponding answers. As shown and described in FIG. 1, two other forms of GT are generated, including usage and curation based GT. Referring to FIG. 4, a flow chart (400) is provided to illustrate a process for generating usage based GT. A usage log that records or recorded an original query text and all follow-up questions presented to the user, and selections made by the user with an eventual solution or action plan, is provided (402). The usage log includes feedback as to whether the query as represented in the query text was satisfactorily answered. The variable $X_{Total}$ is assigned to the quantity of queries in the usage log that have feedback indicative of at least a satisfactory resolution (404). A corresponding query counting variable, X, is initialized (406). For query$_X$, the query text is obtained from the usage log (408), a follow-up question to query$_X$ is also obtained from the usage log (410), and a user selection is obtained (412). In an interaction between a user and a chatbot, the chatbot may provide the user a follow-up question and selectable options as an answer. This interaction, including a select answer to the options, is gathered or obtained at steps (408)-(412). It is then determined if the solution to the query has been reached (414). The system knows that information it is sending to the user is a follow-up questions, and it also knows what information is a solution to the user's problem. When the system has sent the solution and not the next follow-up question, then it is determined that the solution to the query has been reached. A negative response to the determination at step (414) is followed by an increment of the query counting variable (416) and a return to step (408). Conversely, a positive response to the determination at step (414) is followed by the user selection being identified as the solution (418). The query text, follow-up question(s), and user selection obtained at step (408)-(412), and (418), respectively, is recorded as a workflow, and referred to herein as usage based GT. Accordingly, the usage log is evaluated to identify and record one or more questions and a user selection corresponding to query text as usage based GT.

Figure 5:
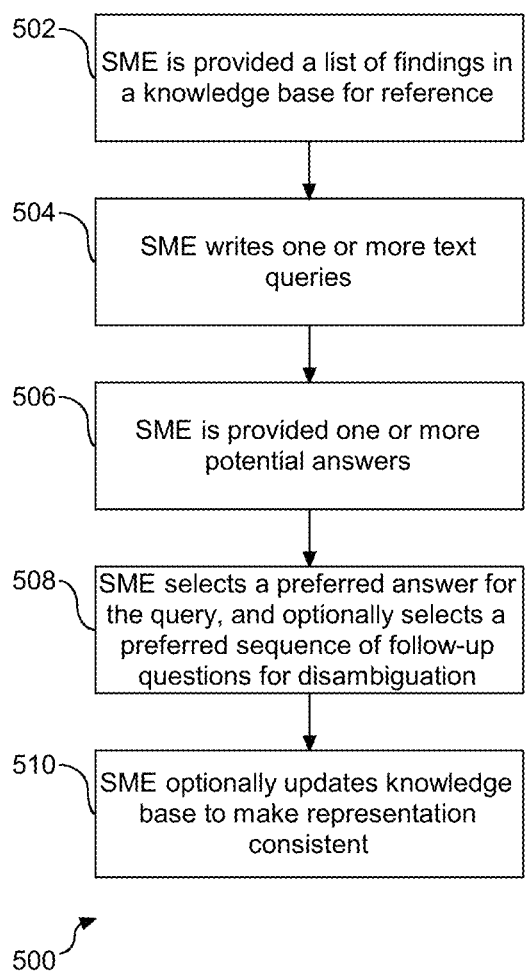
FIG. 5 depicts a flowchart illustrating an embodiment of a method of generating curation based GT.

Referring to FIG. 5, a flow chart (500) is provided to illustrate a process for generating curation based GT. In an exemplary embodiment, the curation based GT is manually generated by one or more subject matter experts (SMEs). As shown, the SME is provided a list of symptoms in a knowledge base for reference (502). The SME writes one or more text queries (504), and for reference the SME is provided one or more potential answers for the query and the relevant entities, e.g. constraints, for each question (506). The SME selects a preferred answer for the query and optionally a preferred sequence of follow-up questions for disambiguation (508). In the case of a disambiguation question, a consistency check is performed to validate if the disambiguation option(s) are consistent with the corresponding knowledge base, and the knowledge base may be optionally updated to make the representation consistent (510). A flow of the text queries and corresponding answers, and in an exemplary embodiment one or more follow-up questions for disambiguation, is recorded and saved as GT. Accordingly, the recordation of curation based GT is provided by with SME assistance.

Figure 6:
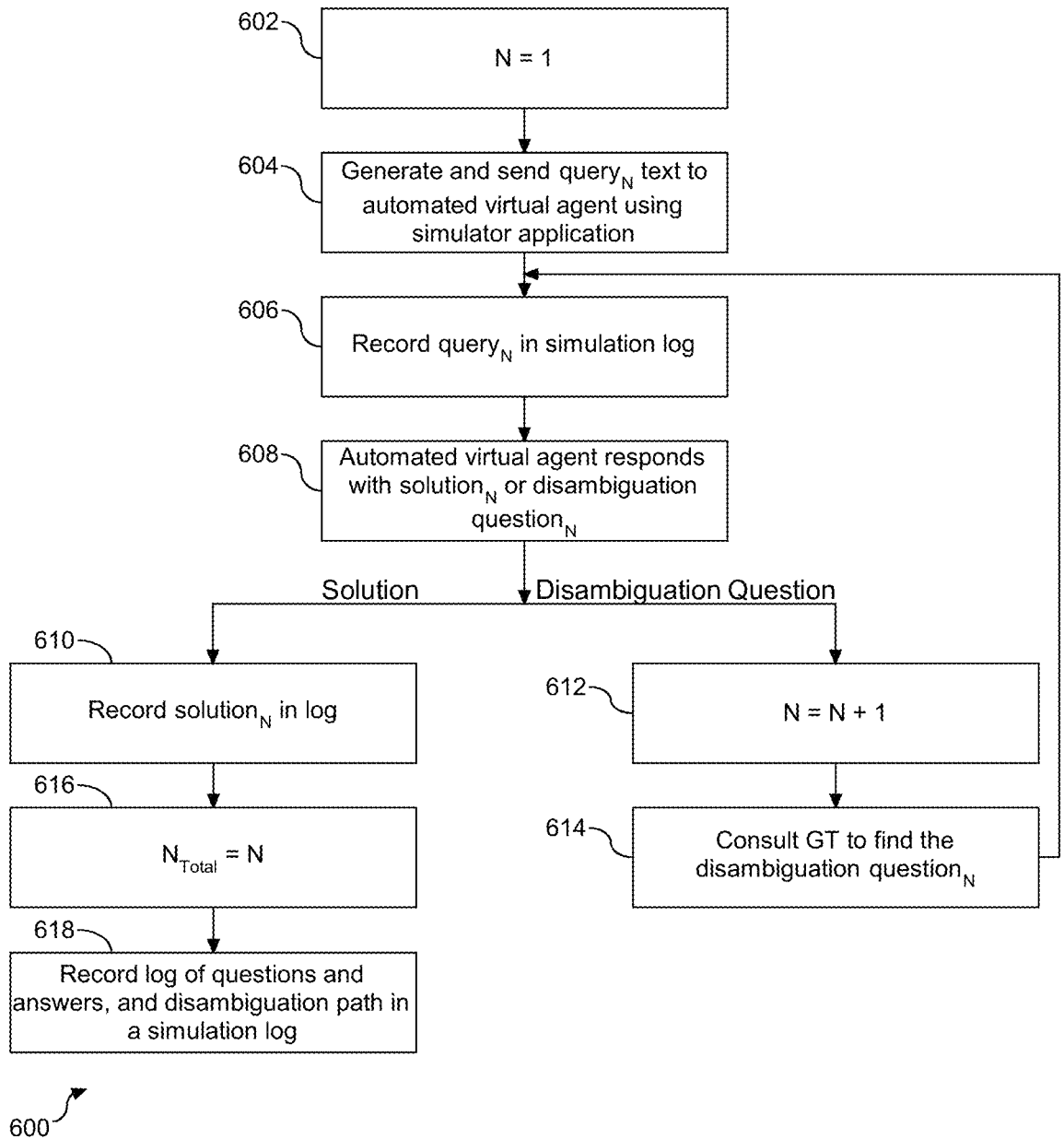
FIG. 6 depicts a flowchart illustrating an embodiment of a method of simulating interaction with the dialog system.

As shown and described in FIG. 1, the simulator (154) is provided to support simulation of a NL dialog interaction. Referring to FIG. 6, a flow chart (600) is provided to illustrate a process for simulating interaction with the dialog system (160). A disambiguation selection path counting variable, N, is initialized (602), GT data is leveraged as a source to drive interaction with the virtual dialog agent, and a query, e.g. query$_N$, is generated and sent to the automated virtual agent using the operatively coupled simulator application (604). The query is recorded in a corresponding simulation log (606). The automated virtual agent responds to the query with a solution or a set of disambiguation options (608). If the response is a solution, the solution is recorded in the corresponding log (610), and if the response is a set of disambiguation questions, then the disambiguation selection path counting variable, N, is incremented (612), followed by consultation of the GT to find the disambiguation question in the GT for this query (614). In an exemplary embodiment, if the disambiguation question is not found in the GT for this query, then depending on the configuration the process may stop, select "any" if provided as an option, or randomly select one of the provided options. In the case if a question is selected then the process returns to step (606). Following step (610), the quantity of disambiguation selection paths is assigned to the variable $N_{Total}$ (616). Thereafter, the log of the questions and answers as obtained or identified from the simulation is recorded in a simulation log (618). Accordingly, the simulator application creates a simulation interaction log recording received input and generated output from the corresponding GT.

Figure 7:
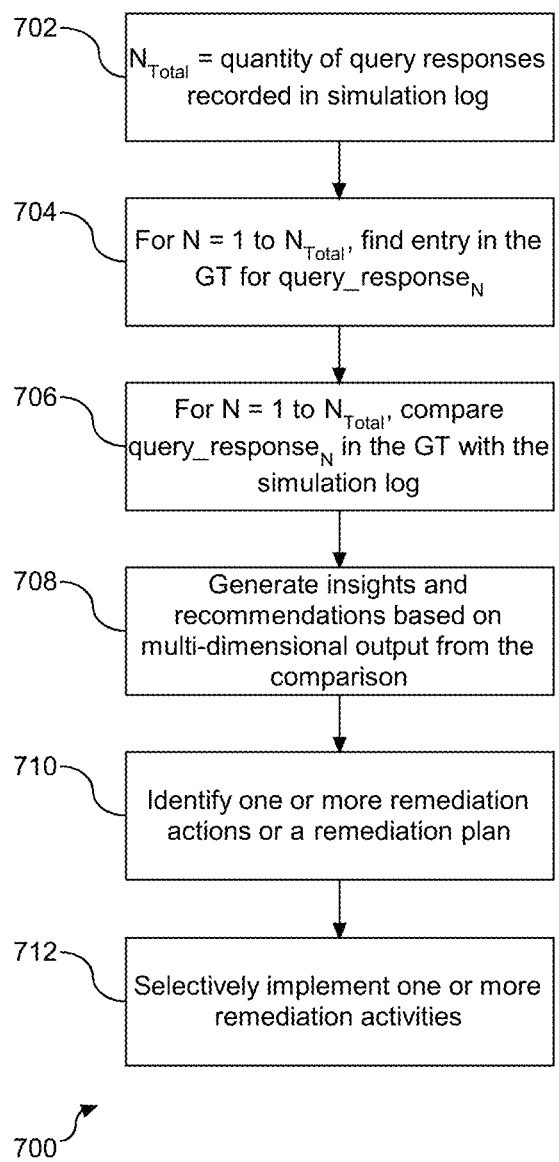
FIG. 7 depicts a flow chart illustrating an embodiment of a method of conducting the virtual dialog system performance evaluation.

The dialog system (160) and the corresponding automated virtual agent (162) are subject to a performance evaluation by leveraging the GT and the corresponding simulation log. Referring to FIG. 7, a flow chart (700) is provided to illustrate a process for conducting the virtual dialog system performance evaluation. As shown, the variable $N_{Total}$ is assigned to the quantity of query-responses recorded in the simulation log (702), and a corresponding counting variable, N, is initialized (704). For each query-response$_N$, a corresponding entry in the GT is found (706). The query-response in the simulation log is compared with the query-response in the GT (708). A multi-dimensional output is generated from the comparison at step (708), including: 1. the quantity of disambiguation questions actually asked and the difference between the quantity in the GT, 2. whether or not the questions were asked in the same order, and 3. if the solution presented in the simulation log matches with the GT solution. Insights and recommendations are generated based on output generated for each of the multiple dimensions (710). In an exemplary embodiment, one or more additional dimensions may be added to the evaluation, or conversely, a reduced quantity of dimensions may be employed for the evaluation. Accordingly, as shown herein, a comparison of the simulation log and the GT provides insight into performance of the dialog system (160).

The output data at step (710) includes insights and recommendations based on various metrics collected. Business goals may be pre-defined in terms of metrics and corresponding metric measurements, such as expected accuracy of the chatbot, along with an acceptable error range. Examples of such metrics includes, but is not limited to, accuracy, interaction overhead, interaction length, quality of follow-up questions, and response time. In an exemplary embodiment, the metrics may be prioritized, such as assignment of a priority to accuracy in place of response time. Recommendations corresponding to the collected metrics are directed at an automatic comparison of a defined or pre-defined business goal against an actual metric reflecting performance and identification of one or more corresponding remediation actions. As shown herein, one or more remediation actions for application to the dialog system (160) based on the corresponding output is identified (712) and selectively implemented (714). For example, in an embodiment, the one or more remediation actions may be identified when the performance evaluation of the virtual dialog agent (162) fails to satisfy a performance threshold. In an exemplary embodiment, the recommendation(s), also referred to herein as a recommendation plan, is directed at improving interaction overhead, which may be implemented by collecting additional real-time data, and reducing interaction length. In an embodiment, other recommendations may be implemented, and as such the examples provided herein should not be considered limiting. Accordingly, the remediation actions are directed at improving the performance of the dialog system (160) and the corresponding automated virtual dialog agent (162).

As shown and described in FIGS. 1-7, a computer system, program product, and method are provided to evaluate performance of a multi-turn automated virtual agent using automatically generated GT from an operatively coupled knowledge source. A simulation of NL dialog is conducted using the automated virtual agent and leveraging the GT to drive corresponding dialog. A log is created to document the simulation. Performance of the automated virtual agent is evaluated by comparison of the simulation log with corresponding GT. One or more remediation actions directed at improving performance of the automated virtual agent are identified and selectively implemented based on the simulation and the simulation log performance evaluation.

Figure 8:
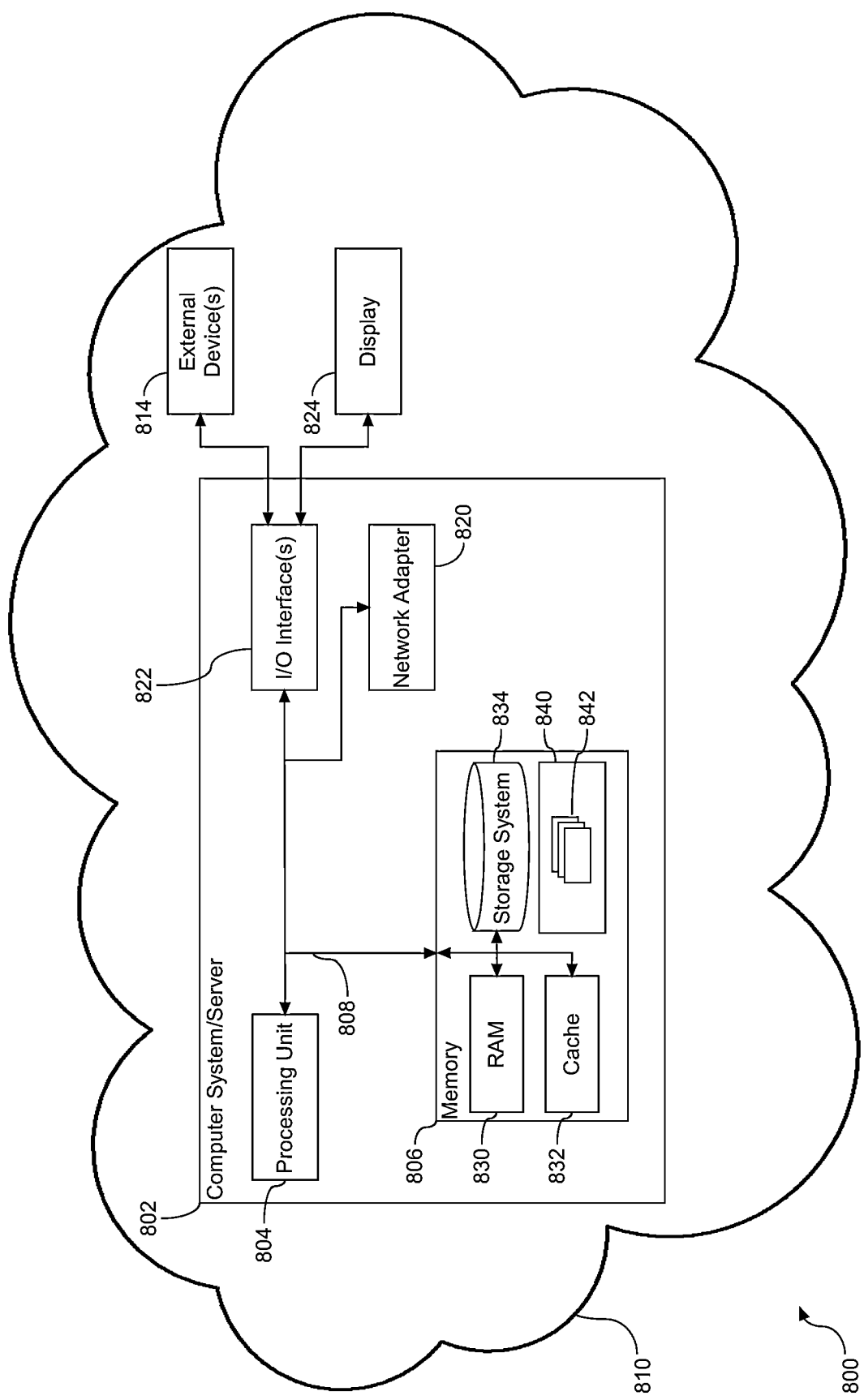
FIG. 8 depicts a block diagram illustrating an example of a computer system/server of a cloud based support system, to implement the system and processes described above with respect to FIGS. 1-7.

Embodiments shown and described herein may be in the form of a computer system for use with an intelligent computer platform for enriching performance of a dialog system and a corresponding automated virtual agent. Aspects of the tools (152), (154), (156), and (158) and their associated functionality may be embodied in a computer system/server in a single location, or in an embodiment, may be configured in a cloud based system sharing computing resources. With reference to FIG. 8, a block diagram (800) is provided illustrating an example of a computer system/server (802), hereinafter referred to as a host (802) in communication with a cloud based support system (810), to implement the system, tools, and processes described above in FIGS. 1-7. In an embodiment, host (802) is a node of a cloud computing environment. The host (802) is operational with numerous other general purpose or special purpose computing system environments or configurations. Examples of well-known computing systems, environments, and/or configurations that may be suitable for use with host (802) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

The host (802) may be described in the general context of computer system-executable instructions, such as program modules, being executed by a computer system. Generally, program modules may include routines, programs, objects, components, logic, data structures, and so on that perform particular tasks or implement particular abstract data types. The host (802) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, the host (802) is shown in the form of a general-purpose computing device. The components of host (802) may include, but are not limited to, one or more processors or processing units (804), e.g. hardware processors, a system memory (806), and a bus (808) that couples various system components including system memory (806) to processor (804). The bus (808) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. The host (802) typically includes a variety of computer system readable media. Such media may be any available media that is accessible by the host (802) and it includes both volatile and non-volatile media, removable and non-removable media.

The system memory (806) can include computer system readable media in the form of volatile memory, such as random access memory (RAM) (830) and/or cache memory (832). By way of example only, storage system (834) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus (808) by one or more data media interfaces.

Program/utility (840), having a set (at least one) of program modules (842), may be stored in the system memory (806) by way of example, and not limitation, as well as an operating system, one or more application programs, other program modules, and program data. Each of the operating systems, one or more application programs, other program modules, and program data or some combination thereof, may include an implementation of a networking environment. Program modules (842) generally carry out the functions and/or methodologies of embodiments to dynamically interpret and understanding request and action descriptions, and effectively augment corresponding domain knowledge. For example, the set of program modules (842) may include the tools (152), (154), (156), and (158) as shown in FIG. 1.

The host (802) may also communicate with one or more external devices (814), such as a keyboard, a pointing device, etc.; a display (824); one or more devices that enable a user to interact with the host (802); and/or any devices (e.g., network card, modem, etc.) that enable the host (802) to communicate with one or more other computing devices. Such communication can occur via Input/Output (I/O) interface(s) (822). Still yet, the host (802) can communicate with one or more networks such as a local area network (LAN), a general wide area network (WAN), and/or a public network (e.g., the Internet) via network adapter (820). As depicted, the network adapter (820) communicates with the other components of the host (802) via the bus (808). In an embodiment, a plurality of nodes of a distributed file system (not shown) is in communication with the host (802) via the I/O interface (822) or via the network adapter (820). It should be understood that although not shown, other hardware and/or software components could be used in conjunction with the host (802). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (806), including RAM (830), cache (832), and storage system (834), such as a removable storage drive and a hard disk installed in a hard disk drive.

Computer programs (also called computer control logic) are stored in memory (806). Computer programs may also be received via a communication interface, such as network adapter (820). Such computer programs, when run, enable the computer system to perform the features of the present embodiments as discussed herein. In particular, the computer programs, when run, enable the processing unit (804) to perform the features of the computer system. Accordingly, such computer programs represent controllers of the computer system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

The functional tools described in this specification have been labeled as managers. A manager may be implemented in programmable hardware devices such as field programmable gate arrays, programmable array logic, programmable logic devices, or the like. The managers may also be implemented in software for processing by various types of processors. An identified manager of executable code may, for instance, comprise one or more physical or logical blocks of computer instructions which may, for instance, be organized as an object, procedure, function, or other construct. Nevertheless, the executables of an identified manager need not be physically located together, but may comprise disparate instructions stored in different locations which, when joined logically together, comprise the managers and achieve the stated purpose of the managers.

Indeed, a manager of executable code could be a single instruction, or many instructions, and may even be distributed over several different code segments, among different applications, and across several memory devices. Similarly, operational data may be identified and illustrated herein within the manager, and may be embodied in any suitable form and organized within any suitable type of data structure. The operational data may be collected as a single data set, or may be distributed over different locations including over different storage devices, and may exist, at least partially, as electronic signals on a system or network.

Figure 9:
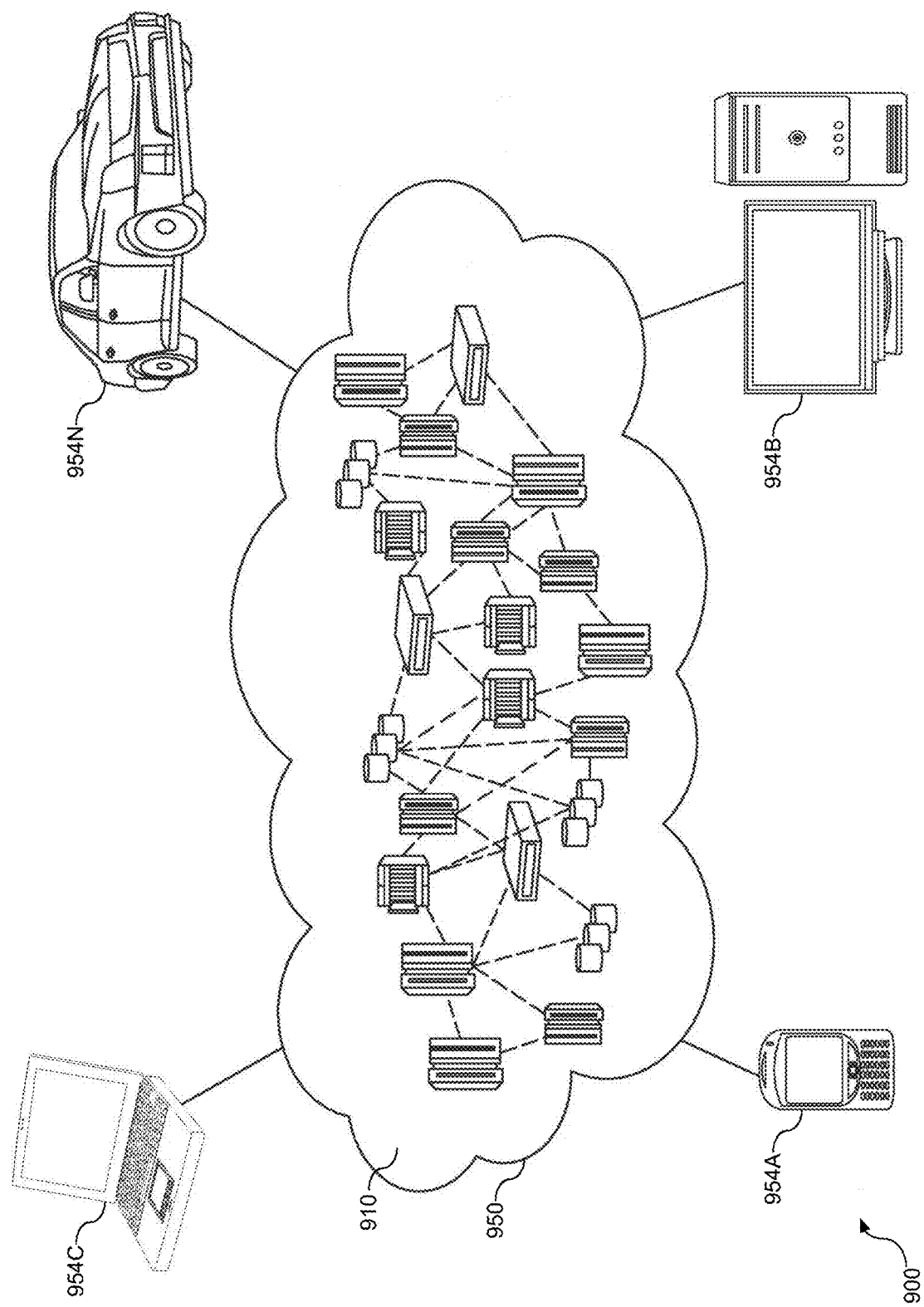
FIG. 9 depicts a block diagram illustrating a cloud computer environment.

Referring now to FIG. 9, an illustrative cloud computing network (900). As shown, cloud computing network (900) includes a cloud computing environment (950) having one or more cloud computing nodes (910) with which local computing devices used by cloud consumers may communicate. Examples of these local computing devices include, but are not limited to, personal digital assistant (PDA) or cellular telephone (954A), desktop computer (954B), laptop computer (954C), and/or automobile computer system (954N). Individual nodes within nodes (910) may further communicate with one another. They may be grouped (not shown) physically or virtually, in one or more networks, such as Private, Community, Public, or Hybrid clouds as described hereinabove, or a combination thereof. This allows cloud computing environment (900) to offer infrastructure, platforms and/or software as services for which a cloud consumer does not need to maintain resources on a local computing device. It is understood that the types of computing devices (954A-N) shown in FIG. 9 are intended to be illustrative only and that the cloud computing environment (950) can communicate with any type of computerized device over any type of network and/or network addressable connection (e.g., using a web browser).

Figure 10:
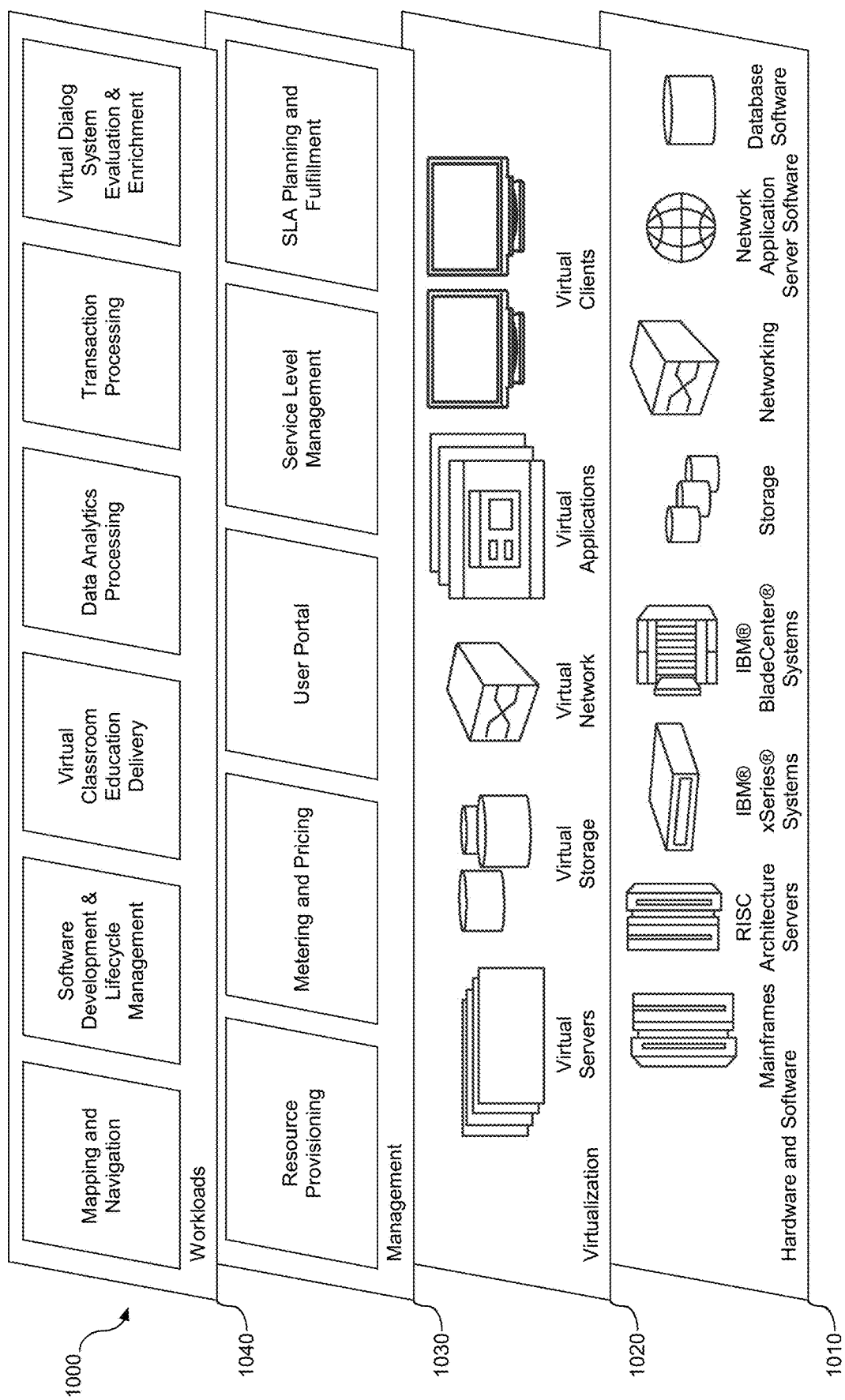
FIG. 10 depicts a block diagram illustrating a set of functional abstraction model layers provided by the cloud computing environment.

Referring now to FIG. 10, a set of functional abstraction layers (1000) provided by the cloud computing network of FIG. 9 is shown. It should be understood in advance that the components, layers, and functions shown in FIG. 10 are intended to be illustrative only, and the embodiments are not limited thereto. As depicted, the following layers and corresponding functions are provided: hardware and software layer (1010), virtualization layer (1020), management layer (1030), and workload layer (1040).

The hardware and software layer (1010) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (1020) provides an abstraction layer from which the following examples of virtual entities may be provided: virtual servers; virtual storage; virtual networks, including virtual private networks; virtual applications and operating systems; and virtual clients.

In an example, management layer (1030) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (1040) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and virtual dialog system evaluation and enrichment.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles. As used herein, the term "and/or" means either or both (or one or any combination or all of the terms or expressed referred to).

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product is operative to support virtual dialog system evaluation and enrichment.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. Accordingly, the scope of protection of the embodiments is limited only by the following claims and their equivalents.

What is claimed is:

1. A computer system comprising:
   a processor operatively coupled to memory and an artificial intelligence (AI) platform operatively coupled to the processor, the AI platform comprising one or more tools to interface with a virtual dialog agent, the one or more tools further comprising:
      a ground truth (GT) manager configured to automatically generate GT from a knowledge source;
      a simulator configured to simulate a natural language (NL) dialog interaction using the virtual dialog agent, the simulator configured to leverage the GT to drive simulated NL dialog generated output, and create a corresponding simulation log;
      an evaluation manager configured to evaluate performance of the virtual dialog agent with respect to the created simulation log in view of the GT; and
      a remediation manager configured to:
         identify one or more remediation actions to the virtual dialog agent responsive to the evaluated performance failing to satisfy a performance threshold; and
         selectively implement one or more of the one or more identified remediation actions.

2. The computer system of claim 1, wherein the GT comprises a usage log and feedback corresponding to the usage log, structured data, a record generated by a subject matter expert, or any combination thereof.

3. The computer system of claim 1, wherein the evaluation manager is configured to compare a query-response pair in the GT with a corresponding query-response pair in the simulation log.

4. The computer system of claim 1, wherein the simulator is further configured to compile a first disambiguation selection path, including:
   generate a NL query and at least one disambiguation NL query;
   generate a NL outcome in response to the at least one disambiguation NL query; and
   record a first log for the first disambiguation selection path.

5. The computer system of claim 4, wherein the simulator is further configured to compile a second disambiguation selection path, including:
   generate a test NL query and at least one test disambiguation NL query;
   generate a test NL response to the at least one test disambiguation NL query; and
   record a second log of the second disambiguation selection path.

6. The computer system of claim 5, wherein the evaluation manager is further configured to compare the recorded first log to the recorded second log.

7. A computer program product to improve performance of a virtual dialog agent, the computer program product comprising:
   a computer readable hardware storage medium or media; and program code stored on the computer readable storage medium or media and executable by a computer processor to:
- automatically generate ground truth (GT) from a knowledge source;
- simulate a natural language (NL) dialog interaction using the virtual dialog agent, including leverage the GT to drive simulated NL dialog generated output, and create a corresponding simulation log;
- evaluate performance of the virtual dialog agent with respect to the created simulation log in view of the GT; and
- identify one or more remediation actions responsive to the evaluated performance failing to satisfy a performance threshold; and
- selectively implement one or more of the one or more identified remediation actions.

8. The computer program product of claim 7, wherein the GT comprises a usage log and feedback corresponding to the usage log, structured data, a record generated by a subject matter expert, or any combination thereof.

9. The computer program product of claim 7, wherein the program code executable by the computer processor to evaluate performance comprises program code executable by the computer processor to compare a query-response pair in the GT with a corresponding query response pair in the simulation log.

10. The computer program product of claim 7, wherein the program code executable by the computer processor to leverage the GT comprises program code executable by the computer processor to compile a first disambiguation selection path, including:
- generate a NL query and at least one disambiguation NL query;
- generate a NL outcome in response to the at least one disambiguation NL query; and
- record a first log for the first disambiguation selection path.

11. The computer program product of claim 10, wherein the program code executable by the computer processor to simulate further comprises program code executable by the computer processor to compile a second disambiguation selection path, including:
- generate a test NL query and at least one test disambiguation NL query;
- generate a test NL response to the at least one test disambiguation NL query; and
- record a second log of the second disambiguation selection path.

12. The computer program product of claim 11, wherein the program code executable by the computer processor to evaluate performance of the virtual dialog agent further comprises program code executable by the computer processor to compare the recorded first log to the recorded second log.

13. A computer-implemented method directed to improving performance of a virtual dialog agent, the method comprising:
- automatically generating, by a computer processor, ground truth (GT) from a knowledge source;
- simulating, by the computer processor, a natural language (NL) dialog interaction using the virtual dialog agent, including leveraging the GT to drive simulated NL dialog generated output, and creating a corresponding simulation log;
- evaluating, by the computer processor, performance of the virtual dialog agent with respect to the created simulation log in view of the GT;
- identifying, by the computer processor, one or more remediation actions to the virtual dialog agent responsive to the evaluated performance failing to satisfy a performance threshold; and
- selectively implementing, by the computer processor, one or more of the one or more identified remediation actions.

14. The computer-implemented method of claim 13, wherein the GT comprises a usage log and feedback corresponding to the usage log, structured data, a record generated by a subject matter expert, or any combination thereof.

15. The computer-implemented method of claim 13, wherein the evaluating comprises comparing a query-response pair in the GT with a corresponding query-response pair in the simulation log.

16. The computer-implemented method of claim 13, wherein leveraging the GT comprises compiling, by the computer processor, a first disambiguation selection path, said compiling comprising:
- generating a NL query and at least one disambiguation NL query;
- generating a NL outcome in response to the at least one disambiguation NL query; and
- recording a first log for the first disambiguation selection path.

17. The computer-implemented method of claim 16, wherein the simulating further comprises compiling, by the computer processor, a second disambiguation selection path, comprising:
- generating a test NL query and at least one test disambiguation NL query;
- generating a test NL response to the at least one test disambiguation NL query; and
- recording a second log for the second disambiguation selection path.

18. The computer-implemented method of claim 17, wherein the evaluating performance of the virtual dialog agent further comprises comparing the recorded first log to the recorded second log.

* * * * *